US010043090B2

(12) United States Patent
Tanaka et al.

(10) Patent No.: US 10,043,090 B2
(45) Date of Patent: Aug. 7, 2018

(54) INFORMATION PROCESSING DEVICE, INFORMATION PROCESSING METHOD, COMPUTER-READABLE RECORDING MEDIUM, AND INSPECTION SYSTEM

(71) Applicants: Takuya Tanaka, Kanagawa (JP); Ryosuke Kasahara, Kanagawa (JP)

(72) Inventors: Takuya Tanaka, Kanagawa (JP); Ryosuke Kasahara, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/365,244

(22) Filed: Nov. 30, 2016

(65) Prior Publication Data

US 2017/0154234 A1 Jun. 1, 2017

(30) Foreign Application Priority Data

Dec. 1, 2015 (JP) .................................. 2015-234843
Sep. 23, 2016 (JP) .................................. 2016-185440

(51) Int. Cl.
*G06K 9/00* (2006.01)
*G06K 9/32* (2006.01)
(Continued)

(52) U.S. Cl.
CPC ............. *G06K 9/3233* (2013.01); *G06K 9/40* (2013.01); *G06K 9/46* (2013.01); *G06K 9/64* (2013.01);
(Continued)

(58) Field of Classification Search
CPC .......... G06K 9/3233; G06K 9/40; G06K 9/46; G06K 9/64; G06K 2209/21; G06T 7/0008; G06T 7/001
See application file for complete search history.

(56) References Cited

U.S. PATENT DOCUMENTS 7,974,458 B2 * 7/2011 Huang ................. H04N 17/002
348/246
8,184,923 B2 * 5/2012 Hayakawa ............. G09G 3/006
382/264
(Continued)

FOREIGN PATENT DOCUMENTS

JP 2003-248827 9/2003
JP 2005-265661 9/2005
(Continued)

OTHER PUBLICATIONS

Extended Search Report dated May 8, 2017 in European Patent Application No. 16201016.9.
(Continued)

*Primary Examiner* — Ali Bayat
(74) *Attorney, Agent, or Firm* — Oblon, McClelland, Maier & Neustadt, L.L.P.

(57) ABSTRACT

An information processing device inspects a target image that contains an image of an inspection target. The information processing device includes a pre-processor, a first calculator, a second calculator, and a determiner. The pre-processor is configured to perform pre-processing for comparing the target image with a reference image or a plurality of reference images. The first calculator is configured to define, in the target image, a region of interest (ROI) and surrounding regions that are adjacent to the ROI, and calculate a feature value of the ROI. The second calculator is configured to calculate an outlier from comparison with feature values of images corresponding to the ROI and the surrounding regions in the reference images. The outlier numerically indicates singularity of an image at the ROI. The determiner is configured to provide, based on the outlier, an indicator to be used for the inspection.

14 Claims, 14 Drawing Sheets

(51) Int. Cl.
- *G06K 9/64* (2006.01)
- *G06K 9/40* (2006.01)
- *G06K 9/46* (2006.01)
- *G06T 7/00* (2017.01)

(52) U.S. Cl.
CPC .......... *G06T 7/001* (2013.01); *G06K 2209/21* (2013.01)

(56) References Cited

U.S. PATENT DOCUMENTS

| | | | |
|---|---|---|---|
| 8,705,839 B2* | 4/2014 | Zhang | G06T 7/0008 382/144 |
| 2003/0113000 A1 | 6/2003 | Hyoki et al. | |
| 2009/0174797 A1* | 7/2009 | Hu | H04N 5/3675 348/247 |
| 2013/0202188 A1 | 8/2013 | Urano et al. | |
| 2014/0285830 A1* | 9/2014 | Kawano | G06K 15/1878 358/1.9 |

FOREIGN PATENT DOCUMENTS

| | | |
|---|---|---|
| JP | 2013-160629 | 8/2013 |
| JP | 2016-110290 | 6/2016 |

OTHER PUBLICATIONS

Varun Chandola, et al., "Anomaly Detection: A Survey", ACM Copmputing Surveys, vol. 41, No. 3, Article 15, Jul. 2009, XP058269522, 58 pages.

Scott Krig, "Interest Point Detector and Feature Descriptor Survey", Computer Vision metrics, May 26, 2014, chapter 6, XP055241490A, 66 pages.

Philipp Fischer, et al., "Descriptor Matching with Convolutional neural Networks: a Comparison to SIFT", XP055367379, May 22, 2014, 10 pages.

Fujiyosi Laboratory, Department of Computer Science, Chubu University, "Image Local Feature and Specific Object Recognition—SIFT and recent approaches—" [online], [retrieved on Nov. 24, 2015] Retrieved from <http://www.vision.cs.chubu.ac.jp/cvtutorial/PDF/02SIFTandMore.pdf>.

Keiji Yano, "Studies on discrimination of images by unifying contour information and texture information", doctoral dissertation, Kyushu Institute of Design, Mar. 18, 1999, pp. 45-70 [online], [retrieved on Nov. 24, 2015] Retrieved from <http://www.design.kyushu-u.ac.jp/lib/doctor/1999/k032/k032-05.pdf>.

Intelligent Systems and Informatics Lab., "Higher-order Local AutoCorrelation feature" [online], [retrieved on Nov. 24, 2015] Retrieved from <http://www.isi.imi.i.u-tokyo.ac.jp/en/pattern/hlac.html>.

Takahumi Suzuki and Takashi Izumi, "The person's expression classification based on the extraction of face feature and the amount of feature movement—Facial expression classification based on HLAC-feature and k-Nearest-Neighbor method—", Workshop Proceedings, College of Science and Technology, Nihon University, 2009, pp. 508-509 [online], [retrieved on Nov. 24, 2015] Retrieved from <http://www.cst.nihon-u.ac.jp/research/gakujutu/53/pdf/G-1.pdf>.

Hironobu Fujiyoshi, "Gradient-Based Feature Extraction—SIFT and HOG—", Technical Reports, Information Processing Society of Japan, CVIM 160, Sep. 2007, pp. 211-224 [online], [retrieved on Nov. 24, 2015] Retrieved from <http://www.hci.iis.u-tokyo.ac.jp/~ysato/class14/supplements/sift_tutorial-Fujiyoshi.pdf>.

Bay, H., A. Ess, T. Tuytelaars, and L. Van Gool, "SURF:Speeded Up Robust Features", Computer Vision and Image Understanding (CVIU), vol. 110, No. 3, 2008, pp. 346-359.

Geoffrey E. Hinton; R. R. Salakhutdinov, "Reducing the Dimensionality of Data with Neural Networks", Science 313 (5786), Jul. 28, 2006, pp. 504-507.

Kai Sasaki, "Extracting Features with Autoencoder" [online], [retrieved on Nov. 24, 2015] Retrieved from <http://www.slideshare.net/lewuathe/auto-encoder-v2>.

* cited by examiner

FIG.3

| 0 | 1 | 2 | 3 |
|---|---|---|---|
| 0 | 2 | 3 | 3 |
| 2 | 1 | 1 | 1 |
| 3 | 0 | 3 | 0 |

IMAGE A
4 BY 4 PIXELS
NUMBER IN EACH RECTANGLE IS GRADATION VALUE

LENGTH OF RUN

DENSITY

| | 1 | 2 | 3 | 4 |
|---|---|---|---|---|
| 0 | 4 | 0 | 0 | 0 |
| 1 | 1 | 0 | 1 | 0 |
| 2 | 3 | 0 | 0 | 0 |
| 3 | 3 | 1 | 0 | 0 |

$P(i, j; 0°)$

| 4 | 0 | 0 | 0 |
|---|---|---|---|
| 4 | 0 | 0 | 0 |
| 0 | 0 | 1 | 0 |
| 3 | 1 | 0 | 0 |

$P(i, j; 45°)$

| 2 | 1 | 0 | 0 |
|---|---|---|---|
| 4 | 0 | 0 | 0 |
| 3 | 0 | 0 | 0 |
| 3 | 1 | 0 | 0 |

$P(i, j; 90°)$

| 4 | 0 | 0 | 0 |
|---|---|---|---|
| 4 | 0 | 0 | 0 |
| 3 | 0 | 0 | 0 |
| 3 | 0 | 0 | 0 |

$P(i, j; 135°)$ encode: y=s(Wx+b)
decode: z=s(Wy' y+b')

FIG.9
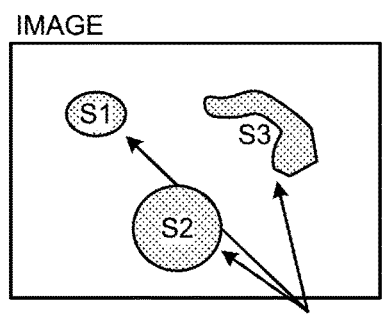
REGIONS IN WHICH OUTLIERS ARE EQUAL TO OR MORE THAN CERTAIN VALUE
(a)
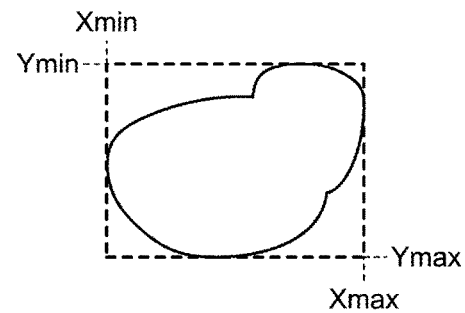
(b)

INFORMATION PROCESSING DEVICE, INFORMATION PROCESSING METHOD, COMPUTER-READABLE RECORDING MEDIUM, AND INSPECTION SYSTEM

CROSS-REFERENCE TO RELATED APPLICATIONS

The present application claims priority under 35 U.S.C. § 119 to Japanese Patent Application No. 2015-234843, filed Dec. 1, 2015, and Japanese Patent Application No. 2016-185440, filed Sep. 23, 2016. The contents of which are incorporated herein by reference in their entirety.

BACKGROUND OF THE INVENTION

1. Field of the Invention

The present invention relates to an information processing device, an information processing method, a computer-readable recording medium, and an inspection system.

2. Description of the Related Art

Techniques for detecting distinguishing points (pixels) and regions within images, such as detection of abnormalities through appearance inspection of products or using monitoring cameras, have been already known. In conventional techniques for detecting distinctive points (pixels) and regions within images, a group of reference images that are normal are prepared in advance. A step that often follows this is calculating the difference between feature values, such as luminance values, of each pixel and a corresponding pixel in inspection target images and reference images to identify changes between images.

For example, Japanese Unexamined Patent Application Publication No. 2005-265661 proposes image inspection configured to statistically determine a normal range of luminance values in an inspection target image in appearance inspection of products, thereby being independent of an inspection operator. Japanese Unexamined Patent Application Publication No. 2013-160629 proposes a method in which averages and standard deviations of luminance values of corresponding pixels in the respective reference images are determined in advance. In the method, when inspection is then conducted, standard scores for respective pixels are obtained by subtracting the corresponding average values from luminance values in an inspection target image and then dividing results of the subtraction by the corresponding standard deviations, and a pixel the standard score of which is larger than a previously determined threshold is identified as an abnormal pixel.

However, the conventional techniques are disadvantageous in that abnormalities cannot be adequately detected when there is an error in positioning of an inspection target and there is a slight change in shape of an inspection target. Furthermore, the method in which standard scores are obtained using averages all over an image is disadvantageous in that a local abnormality cannot be detected in some cases because a locally existing abnormality acts as a noise component all over the image.

SUMMARY OF THE INVENTION

According to one aspect of the present invention, an information processing device inspects a target image that contains an image of an inspection target. The information processing device includes a pre-processor, a first calculator, a second calculator, and a determiner. The pre-processor is configured to perform pre-processing for comparing the target image with a reference image or a plurality of reference images. The first calculator is configured to define, in the target image, a region of interest (ROI) and surrounding regions that are adjacent to the ROI, and calculate a feature value of the ROI. The second calculator is configured to calculate an outlier from comparison with feature values of images corresponding to the ROI and the surrounding regions in the reference images. The outlier numerically indicates singularity of an image at the ROI. The determiner is configured to provide, based on the outlier, an indicator to be used for the inspection.

BRIEF DESCRIPTION OF THE DRAWINGS

FIG. 3 is a diagram illustrating an implementation form of an inspection system 300 in which a processing method according to the present embodiment is implemented;

FIG. 9 is a conceptual diagram of an implementation form that obtains a defection score according to the present embodiment;

The accompanying drawings are intended to depict exemplary embodiments of the present invention and should not be interpreted to limit the scope thereof. Identical or similar reference numerals designate identical or similar components throughout the various drawings.

DESCRIPTION OF THE EMBODIMENTS

Figure 1:
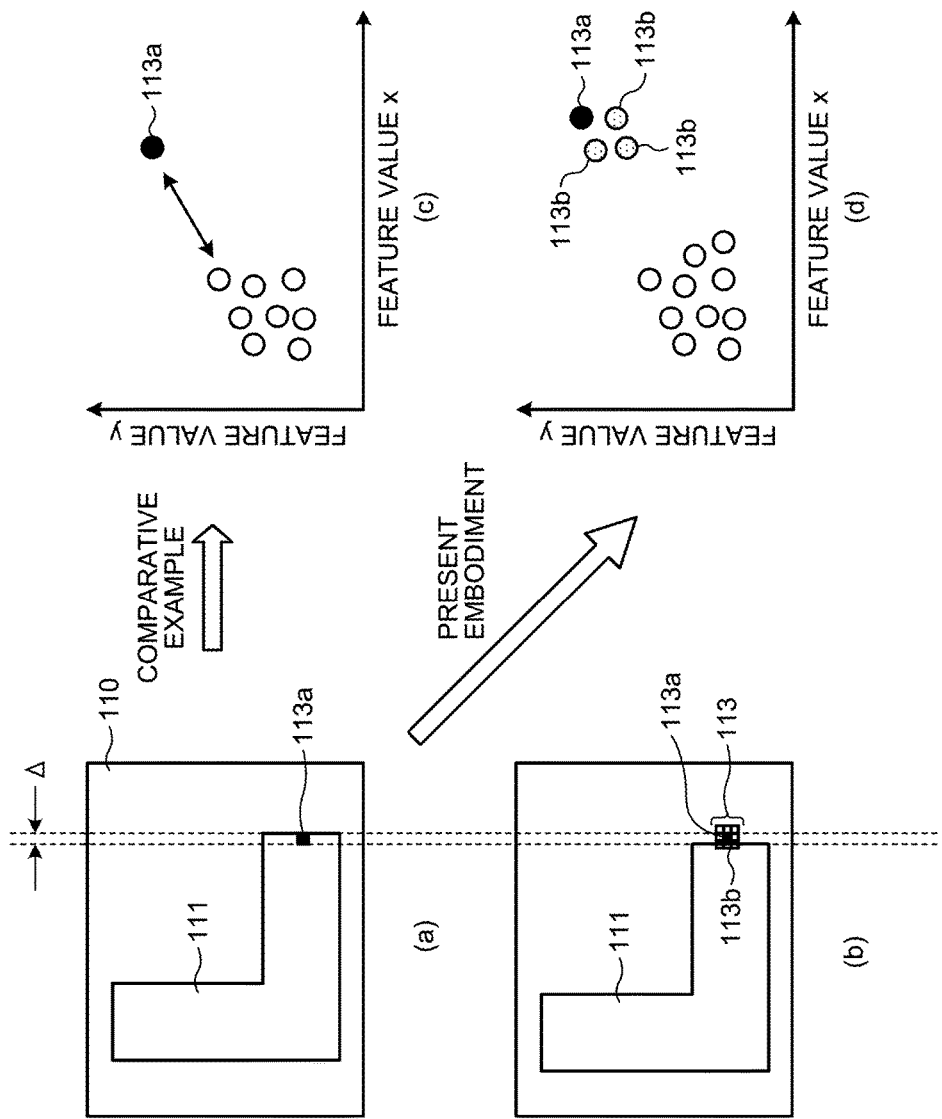
FIG. 1 is a conceptual diagram explaining conformity determination methods according to the present embodiment and a conventional method.

The terminology used herein is for the purpose of describing particular embodiments only and is not intended to be limiting of the present invention.

As used herein, the singular forms "a", "an" and "the" are intended to include the plural forms as well, unless the context clearly indicates otherwise.

In describing preferred embodiments illustrated in the drawings, specific terminology may be employed for the sake of clarity. However, the disclosure of this patent specification is not intended to be limited to the specific terminology so selected, and it is to be understood that each specific element includes all technical equivalents that have the same function, operate in a similar manner, and achieve a similar result.

An embodiment of the present invention will be described in detail below with reference to the drawings.

An object of an embodiment is to provide a technique that enables efficient detection of an abnormality within an image.

The following describes the present invention by way of embodiments; however, the present invention is not limited by the embodiment described below. FIG. 1 is a conceptual diagram of conformity determination in inspection methods according to the present embodiment and a conventional technique cited as a comparative example.

In the present embodiment, as illustrated in (a) in FIG. 1, inspection is conducted using a target image in which an inspection target 111 captured is imaged within an inspection region 110. In the present embodiment, inspection as to whether an inspection target, an image of which has been captured in a target image, is conforming or nonconforming is conducted through comparison with a target image having an image of an inspection target determined as a conforming item or a group of target images having images of inspection targets determined as conforming items. Hereinafter, a target image having an image of an inspection target determined as a conforming item or a group of target images having images of inspection targets determined as conforming items are referred to as a reference image or reference images in this disclosure. One of the reference images is illustrated in (b) in FIG. 1. As compared with (b) in FIG. 1, the inspection target 111 in the target image illustrated in (a) in FIG. 1 is illustrated as being displaced or deformed, within the inspection region 110, to the right only by an allowable range Δ. The allowable range Δ is equal to or less than a positional accuracy limit of a robot arm or an allowable accuracy limit for the product. For this reason, the inspection target 111 is an inspection target supposed to be determined to be a conforming item.

As illustrated in (a) and (b) in FIG. 1, in the present embodiment, a region of interest (hereinafter, ROI) 113a is set in an image region that forms the inspection region 110. It is indicated that the ROI 113a in the reference image in (b) in FIG. 1 does not contain the image of the inspection target 111. In an implementation form illustrated in (a) in FIG. 1, however, the ROI 113a contains the image of the inspection target 111. In a conventional method, the conformity of the inspection target 111 is determined based on the difference between feature values of the ROI 113a. This is illustrated in (c) in FIG. 1.

In FIG. 1, (c) is a diagram illustrating the feature value of the ROI 113a, in the target image, that has been plotted assuming that such feature values can be two-dimensionally expressed. In (c) in FIG. 1, while a pixel, in the target image, that contains the inspection target 111 is indicated by a solid black circle, and a pixel therein that does not contain the image of the inspection target 111 is indicated by a solid white circle. In contrast, the inspection target 111 is not contained in the reference image illustrated in (b) in FIG. 1, which means that there is no solid black circle in (c) in FIG. 1.

The feature value of an image of a solid black circle has a large difference with the corresponding feature value of the reference image, thus being present singularly. In the conventional technique, the inspection target 111 of the target image is thus treated as a nonconforming item. However, the inspection target 111 is supposed to be determined to be a conforming item because the displacement thereof is within the allowable range Δ. Such erroneous determination reduces the product yield and the productivity.

For this reason, in the present embodiment, an ROI 113a and surrounding regions 113b that are adjacent to the ROI 113a are defined, and a section of interest (hereinafter, SOI) 113 that includes the ROI 113a and the surrounding regions 113b is formed, in the inspection region 110. The singularity of the ROI 113a is then determined by use of this SOI 113. In FIG. 1, (b) illustrates the SOI 113, and the ROI 113a and 113b that form the SOI 113. In FIG. 1, (b) also illustrates an example in which the SOI 113 according to the present embodiment is formed as a square region containing the ROI 113a and the surrounding region 113b set adjacently to the ROI 113a.

In FIG. 1, (d) illustrates, in the similar manner as (c) in FIG. 1 does, feature values of the inspection target 111 imaged in the SOI 113 that have been plotted in a feature value space in the present embodiment. In FIG. 1, (d) is the same as (c) in FIG. 1 in that, while a pixel, in the reference image, that contains the inspection target 111 is indicated by a solid black circle, and a pixel therein that does not contain the image of the inspection target 111 is indicated by a solid white circle. The surrounding regions 113b that partly contain the image of the inspection target 111 are indicated by halftone shaded circles. The feature value of the ROI 113a has the same difference as in (a) in FIG. 1 with the corresponding feature value in the reference image because the inspection target is imaged in the ROI 113a.

In contrast, in the present embodiment, as illustrated in (d) in FIG. 1, the SOI 113 is formed of a plurality of pixels, so that the feature values of the surrounding regions 113b, which have feature values in the reference image, are added around the feature value of the ROI 113a. This makes it possible to determine the feature value of the ROI 113a in consideration of image information of the surrounding regions 113b. The conventional conforming item determination that depends only on the singularity of the ROI 113a is thus improved. That is, the present embodiment makes it possible to inspect the feature value of the ROI 113a by use of the feature values of the entire SOI 113.

Here, effects of setup of the SOI 113 on determination of nonconforming items are explained with reference to FIG. 2. The inspection target 111 illustrated in FIG. 2 as a product partly has a burr 114. As illustrated in (a) in FIG. 2, the ROI 113a that corresponds to this burr 114 thus contains the image of the inspection target 111. Given this situation, in FIG. 2, (b) illustrates feature values of regions neighboring the burr 114 that have been plotted in a feature value space in the same manner as FIG. 1.

Figure 2:
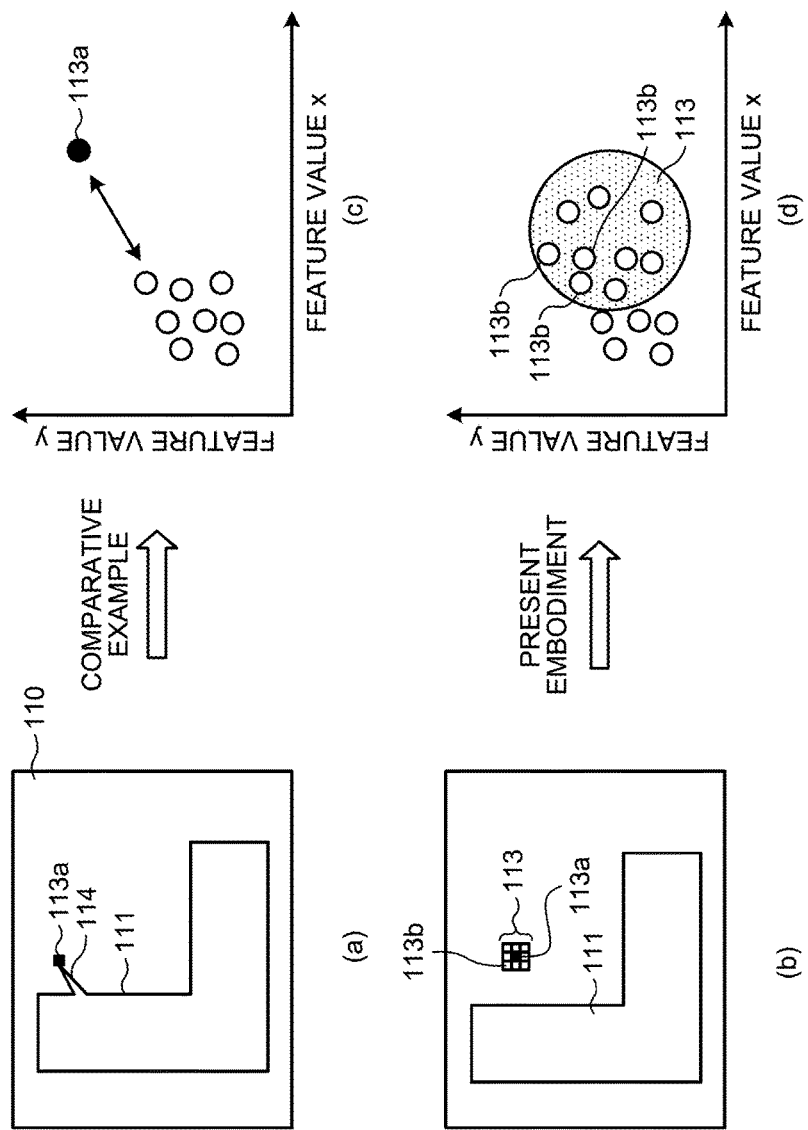
FIG. 2 is a conceptual diagram explaining the conformity determination method according to the present embodiment.

Here, the differences between feature values in the feature value space illustrated in (b) in FIG. 2 are the same as those in (b) in FIG. 1. As a contrasting example, in FIG. 2, (c) illustrates a reference image determined to contain an image of a conforming item and the SOI 113 according to the present embodiment. As illustrated in (c) in FIG. 2, in the corresponding SOI 113 in the reference image, there are no feature values that are approximately the same as those of the SOI 113a in the target image.

Thus, when the burr 114 illustrated in (a) in FIG. 2 is detected, the conformity can be determined by use of a determining method illustrated in (b) in FIG. 2, as is conventionally determined.

Note that the ROI 113a and the surrounding regions 113b can each be defined in units of pixels in accordance with the size of the inspection target 111 and desired accuracy. In another implementation form, each of these regions can be defined as a polygonal region that is formed of a plurality of pixels and that can cover a flat surface. In addition, the sizes, the numbers of included pixels, and the shapes of the SOI 113, the ROI 113a, and the surrounding regions 113b can be set as appropriate in accordance with a specific purpose.

Alternatively, SOIs can be automatically determined from statistical information or the like. For example, variances of the respective pixels are found in advance from the group of reference images, and the sum of variances for an SOI is set. According to this aspect, SOIs can be determined in such a manner that, while a large SOI is obtained for regions the variances of which are low, a small SOI is obtained for regions the variances of which are high. Furthermore, another aspect is applicable in which, with gradient directions of the respective pixels in the group of reference images and the target image found in advance, an aspect ratio of an SOI is changed so that these gradient directions can be preferentially viewed.

As described above, the present embodiment makes it possible to improve the accuracy of conformity determination by enhancing robustness of inspection in such a manner as to reduce detection sensitivity for a change within a normal range without reducing detection sensitivity for nonconforming states.

For the sake of convenience of explanation, the following description assumes that the ROI 113a and the surrounding regions 113b each correspond to a pixel. In the present embodiment, a color-related kind of feature value, such as luminance values or color values, can be used as feature values of an image. As the color-related kind of feature value, feature values of any kind or those expressed by any equation, such as those obtained as L*a*b*, L*uv, or HSV, can be used as long as those feature values can be identified on an image as with luminance values and color values and can be quantified.

When feature values expressed in three dimensions such as color values are used, defection detection can be implemented by obtaining processing results for the respective dimensions and finally merging those results. For example, when red (R), green (G), and blue (B) images are subjected to inspection, defection detection may be conducted in such a manner that, after the outlier calculation described below is performed on each of the R, G, and B images, the average or maximum of the resultant outliers for the respective images is found, so that the images are merged into one image.

Otherwise, more specifically, edge information representing shape information, or spatial frequency information can be used as the feature values of an image in the present embodiment. Other examples of local feature values of an image include higher-order local auto correlation (HLAC), scale-invariant feature transform (SIFT) values, and speeded up robust features (SURF). Further alternative applicable examples include a method using a density co-occurrence matrix so that textures of an image is used as feature values of the image, and feature values automatically obtained by, for example, an auto-encoder based on deep learning. Values quantified by of any one of these methods for extracting image features can be used as feature values in the present embodiment. The above-described feature values applicable as an alternative to the feature values related to colors are described below in detail.

(1) Edge Feature Values

Examples applicable as the edge feature value include a gradient direction and a gradient intensity. The gradient intensity s(u, v) at a pixel position (u, v) can be obtained, for example, by Equation (1) below (Fujiyoshi Laboratory, Department of Computer Science, Chubu University, "Image Local Feature and Specific Object Recognition —SIFT and recent approaches—" [online], [retrieved on Nov. 24, 2015] Retrieved from <http://www.vision.cs.chubu.ac.jp/cvtutorial/PDF/02SIFTand-More.pdf>).

$$m(u, v) = \sqrt{(L(u+1, v) - L(u-1, v))^2 + (L(u, v+1) - L(u, v-1))^2} \quad (1)$$

The gradient direction at a pixel position (u, v) in an image L can be obtained by Equation (2) below.

$$\theta(u, v) = \tan^{-1}\left(\frac{L(u, v+1) - L(u, v-1)}{L(u+1, v) - L(u-1, v)}\right) \quad (2)$$

(2) Spatial Frequency Information

The spatial frequency information can be quantified by using power spectra as the spatial frequency information, and these power spectra can be used also as feature values (Keiji Yano, "Studies on discrimination of images by unifying contour information and texture information", doctoral dissertation, Kyushu Institute of Design, Mar. 18, 1999, pp. 45-70 [online], [retrieved on Nov. 24, 2015] Retrieved from <http://www.design.kyushu-u.ac.jp/lib/doctor/1999/k032/k032-05.pdf>).

$$P(u,v) = |F(u,v)|^2 \quad (3)$$

(3) Texture Feature Values

Spatial frequency information is used as feature values, from which a texture feature value can be obtained by use of Equations (4) below.

$$P(r) = 2\sum_{\theta=0}^{\pi} P(r, \theta) \quad (4)$$

$$q(\theta) = \sum_{r=0}^{W/2} P(r, \theta)$$

The texture feature value defined by Equations (4) above can be used as the feature value in the present embodiment. Here, p(r) is the within a doughnut-shaped region formed with the origin of a power spectrum space at the center thereof. In addition, q(θ) is the sum of energies within a sectorial region. Texture information can be employed as feature values, based on values such as the positions and the heights of the histograms of p(r) and qθ and the averages and/or the variances of p(r) and q(θ).

Although p(r) and q(θ) described above cannot be found for a single pixel, an outlier can be calculated in such a manner that p(r) and q(θ) obtained for a local region having each target pixel at the center are used as a feature value of the target pixel, as in the cases of color-related kinds of feature value.

(4) Local Feature Values

A local feature value provided as a higher-order local auto correlation (HALC) value, $x(a_1, a_2 \ldots, a_n)$, is determined by Equation (5) below (Intelligent Systems and Informatics Lab., "Higher-order Local AutoCorrelation feature" [online], [retrieved on Nov. 24, 2015] Retrieved from <http://www.isi.imi.i.u-tokyo.ac.jp/en/pattern/hlac.html>; and Takahumi Suzuki and Takashi Izumi, "The person's expression classification based on the extraction of face feature and the amount of feature movement—Facial expression classification based on HLAC-feature and k-Nearest-Neighbor method—", Workshop Proceedings, College of Science and Technology, Nihon University, 2009, pp. 508-509 [online], [retrieved on Nov. 24, 2015] Retrieved from <http://www.cst.nihon-u.ac.jp/research/gakujutu/53/pdf/G-1.pdf>).

$$x(a_1, a_2, \ldots, a_N) = \int_P f(r) f(r+a_1) \ldots f(r+a_N) dr \quad (5)$$

r: reference vector $a_i$: displacement vector f: luminance value pattern P: screen (integral range A HALC feature value expressed by two or more dimensions cannot be found for a single pixel. However, an outlier can be defined and calculated in such a manner that an HLAC feature value obtained for a region having each target pixel at the center is used as an HLAC feature value of the target pixel, as in the cases of color-related kinds of feature value. SIFT scores (Fujiyoshi Laboratory, Department of Computer Science, Chubu University, "Image Local Feature and Specific Object Recognition—SIFT and recent approaches—"; and Hironobu Fujiyoshi, "Gradient-Based Feature Extraction—SIFT and HOG—", Technical Reports, Information Processing Society of Japan, CVIM 160, September 2007, pp. 211-224 [online], [retrieved on Nov. 24, 2015] Retrieved from <http://www.hci.iis.u-tokyo.ac.jp/~ysato/class14/supplements/sift_tutorial-Fujiyoshi.pdf>) or SURF (Bay, H., A. Ess, T. Tuytelaars, and L. Van Gool, "SURF:Speeded Up Robust Features", Computer Vision and Image Understanding (CVIU), Vol. 110, No. 3, 2008, pp. 346-359) can also be used as feature values in the present embodiment.

(5) Feature Values Obtained by Using Run-Length Matrices

As a method for extracting features of textures, a method using run-length matrices (Keiji Yano, "Studies on discrimination of images by unifying contour information and texture information", doctoral dissertation, Kyushu Institute of Design, Mar. 18, 1999, pp. 45-70). In the present embodiment, run-length matrices illustrated in FIG. 3 are used to calculate a feature value of each pixel. In each of the run-length matrices illustrated in FIG. 3, the lengths of runs correspond to the row direction, and densities correspond to the column direction.

Any one of or any combination of some or all of feature values given by Equation (6) below that correspond to respective five dimensions can be used as a feature value in the present embodiment by use of the run-length matrices illustrated in FIG. 3 f1: short runs emphasis (6)

$$f_1 = \frac{1}{T} \sum_{i=1}^{g} \sum_{j=1}^{N} \frac{P(i, j; \theta)}{j^2}$$

f2: long runs emphasis $$f_2 = \frac{1}{T} \sum_{i=1}^{g} \sum_{j=1}^{N} j^2 P(i, j; \theta)$$

-continued f3: gray level nonuniformity $$f_3 = \frac{1}{T} \sum_{i=1}^{g} \left[ \sum_{j=1}^{N} P(i, j; \theta) \right]^2$$

f4: run length nonuniformity $$f_4 = \frac{1}{T} \sum_{j=1}^{N} \left[ \sum_{i=1}^{g} P(i, j; \theta) \right]^2$$

f5: run percentage $$f_5 = \frac{1}{N^2} \sum_{i=1}^{g} \sum_{j=1}^{N} P(i, j; \theta)$$

All kinds of texture feature value, including the one that is obtained by the method using run-length matrices, cannot be found for a single pixel. However, an outlier can be calculated in such a manner that a texture feature value obtained for a region having each target pixel at the center is used as a texture feature value of the target pixel, as in the cases of color-related kinds of feature value.

(6) Feature Values Based on Deep Learning

For example, a method for extracting feature values using an auto-encoder (Geoffrey E. Hinton; R. R. Salakhutdinov, "Reducing the Dimensionality of Data with Neural Networks", Science 313 (5786), Jul. 28, 2006, pp. 504-507; and Kai Sasaki, "Extracting Features with Autoencoder" [online], [retrieved on Nov. 24, 2015] Retrieved from <http://www.slideshare.net/lewuathe/auto-encoder-v2>) can be used to obtain feature values based on deep learning. An auto-encoder is a neural network that temporarily maps input to a space of lower dimensions and then reconstructs the input, and is capable of automatically acquiring lower-dimensional and less noise-susceptible expression of the input.

Figure 4:
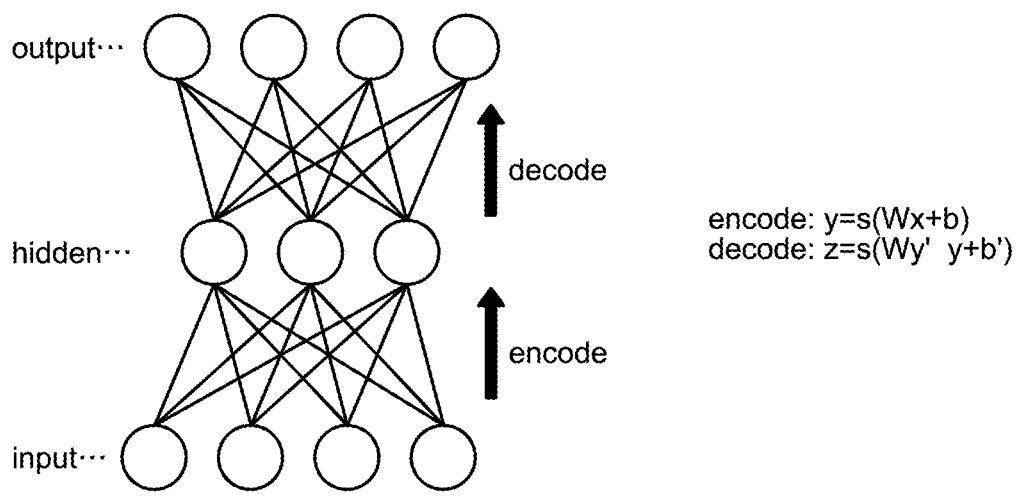
FIG. 4 is a conceptual diagram of processing in an auto-encoder according to the present embodiment.

FIG. 4 illustrates an example of an auto-encoder. The auto-encoder is capable of obtaining a lower-dimensional expression of a target image by performing learning so that, through hidden layers (hidden) the number of dimensions of which is lower than that of input (a vectorized image in this example), "output=input" can be the result. In the present embodiment, values of the hidden among the values illustrated in FIG. 4 can be used as feature values in the present embodiment. Here, the learning can be performed by use of reference images.

In FIG. 4, input layers are denoted as x, input to the hidden is denoted as y, and input to the output is denoted as z. In addition, "encode" and "decode" can be calculated by use of the equations defined in FIG. 4. Parameters called "weight" and "bias" are denoted as W and b, respectively. In an implementation form employing the auto-encoder, feature values can be found with color information (expressed by three dimensions of R, B, and G) of pixels used as the input. The input and the output in FIG. 4 can be three-dimensionally defined, and the hidden therein can be one-dimensionally or two dimensionally defined. Furthermore, outlier calculation can be performed when a value for the hidden that have been found for regions containing each target pixel is used as a feature value.

As described with reference to FIG. 1 to FIG. 4, the present embodiment makes it possible to more efficiently numerically determine the singularity of the neighborhood of a peripheral portion 111a of the inspection target 111 by determining the singularity of an ROI 113a from an image in consideration of the states of surrounding regions thereof.

Figure 5:
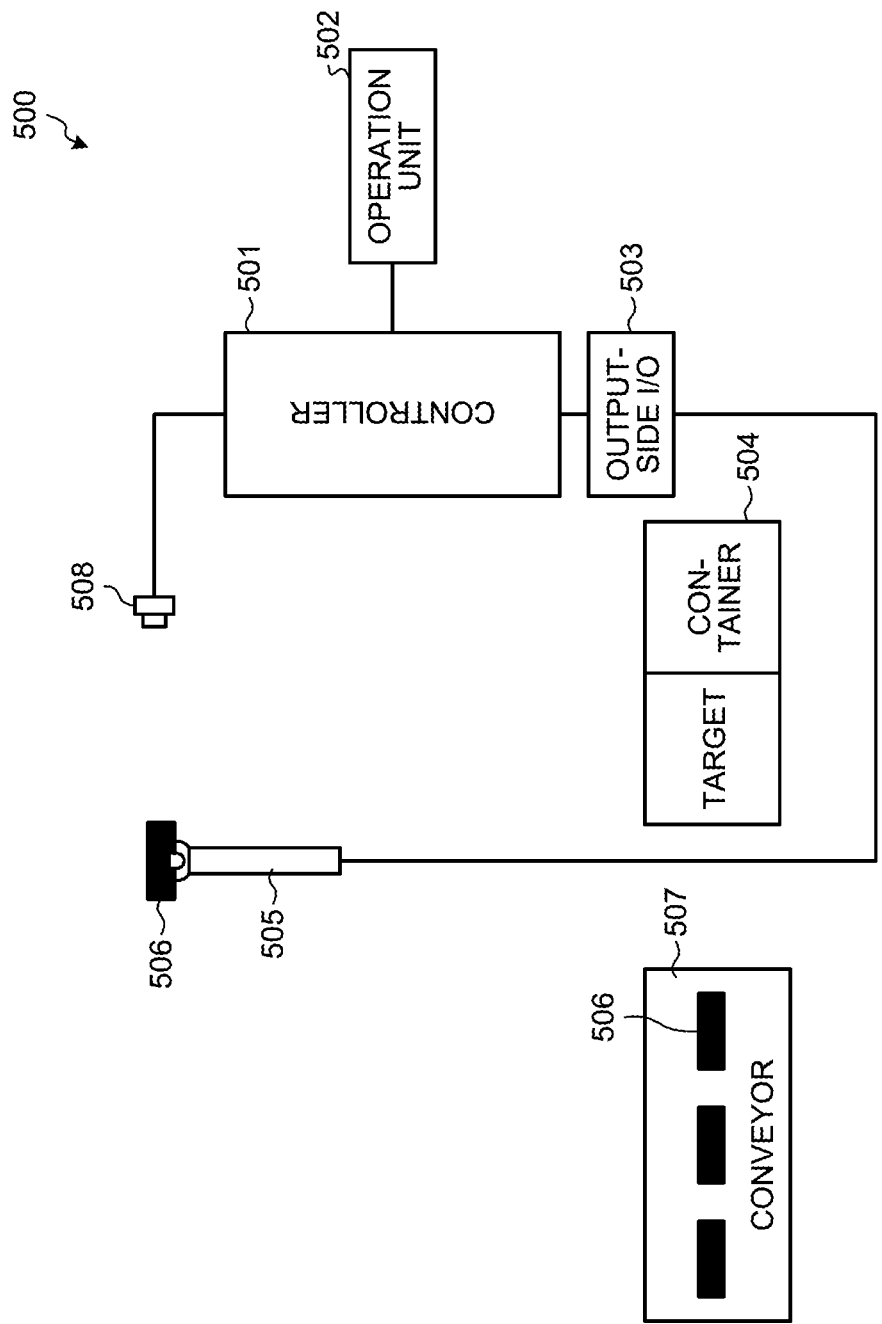
FIG. 5 is a diagram illustrating an implementation form of an inspection system 500 in which a processing method according to the present embodiment is implemented.

FIG. 5 illustrates an implementation form of an inspection system 500 in which the processing method according to the present embodiment is implemented. The inspection system 500 illustrated in FIG. 3 includes a controller 501, an operation unit 502 for providing instructions to the controller 501, and an output-side I/O 503.

The controller 501 is constructed of an information processing device such as a computer. The operation unit 502 is constructed of such components as a liquid crystal display device, a keyboard, a mouse, a touch panel, and the like, and provides interfaces between the controller 501 and an operator. The output-side I/O 503 controls the position of a conveyance arm 505 by generating, based on calculation results from the controller 501, output for moving an inspection target 506, and may be simply referred to as an output unit.

After being placed on a conveyor 507 and held by a conveyance arm 505, the inspection target 506 is conveyed to an inspection position, and an image thereof is captured by an image capturing device 508 such as a digital camera. The image capturing device 508 may be referred to as an image capturing unit. An image captured thereby is transmitted to the controller 501, and inspection is conducted on the image as to whether an inspection target 111 has singularity. In accordance with a result of the inspection, the controller 501 controls moves of the conveyance arm 505 to transfer the inspection target into a container part 504 that stores therein inspection targets while sorting them based on whether they are conforming items or nonconforming items.

Figure 6:
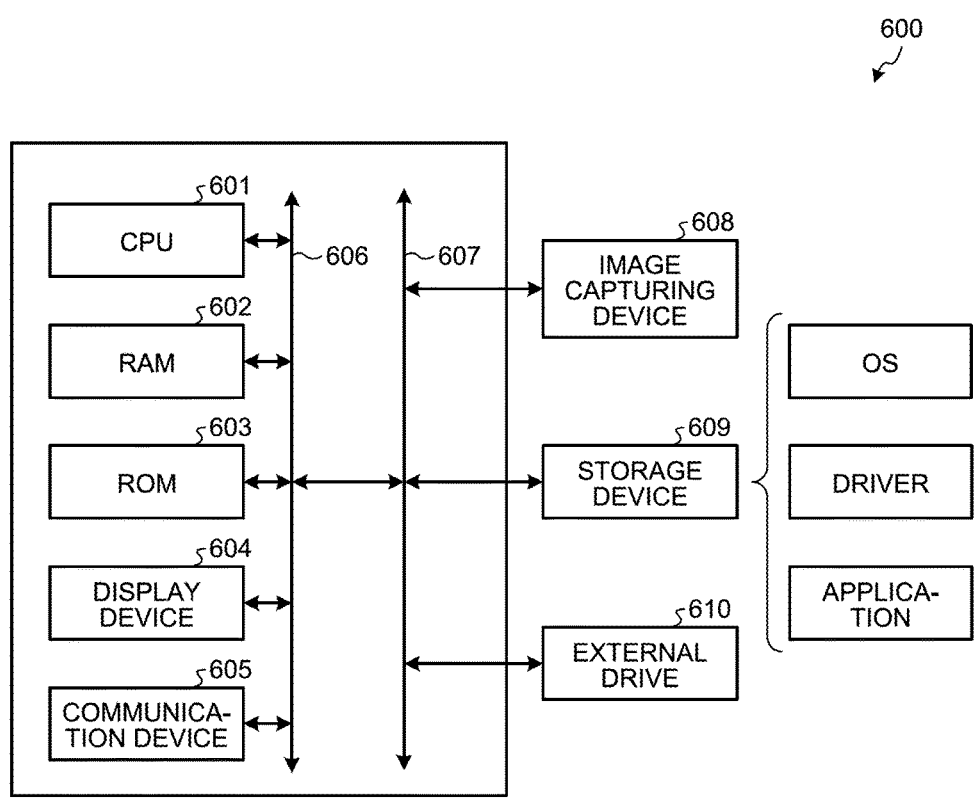
FIG. 6 is a diagram illustrating an implementation form of a hardware block 600 of a controller 501 according to the present embodiment.

FIG. 6 illustrates an implementation form of a hardware block 600 of the controller 501 according to the present embodiment. The controller 501 can be constructed of components connected to one another via a system bus 606, the components including a central processing unit (CPU) 601, a random access memory (RAM) 602, an image RAM if needed, a read-only memory (ROM) 603, a display device 604, and a communication device 605. An I/O bus 607 is further connected to the system bus 606 via a bus bridge such as PCI or PCI Express. In addition, an external drive 610 such as an external drive or a DVD drive is connected to the I/O bus 607 via an appropriate protocol. Furthermore, the controller 501 is connected to an image capturing device 608 such as a digital camera, a storage device 609, and the external drive 610, thereby being enabled to acquire an image and to store computer programs and data whereby processing according to the present embodiment can be performed.

More specific examples of the CPU used for the controller 501 include, but are not limited to, processors branded as Pentium (registered trademark) to Pentium 4 (registered trademark), the Core i (registered trademark) series, and Atom (registered trademark), Pentium (registered trademark)-compatible CPUs, PowerPC (registered trademark) Processors, and MIPS processors.

Examples of an operating system (OS) used therefor include MacOS (trademark), iOS (registered trademark), Windows (registered trademark), Chrome (registered trademark), Android (registered trademark), Windows (registered trademark) 200× Server, UNIX (registered trademark), AIX (registered trademark), LINUX (registered trademark), and other appropriate operating systems. The controller 501 is further enabled to store and execute application programs, written in programming languages such as C, C++, Visual C++, VisualBasic, Java (registered trademark), Perl, and Ruby that run on the above-described OS.

Figure 7:
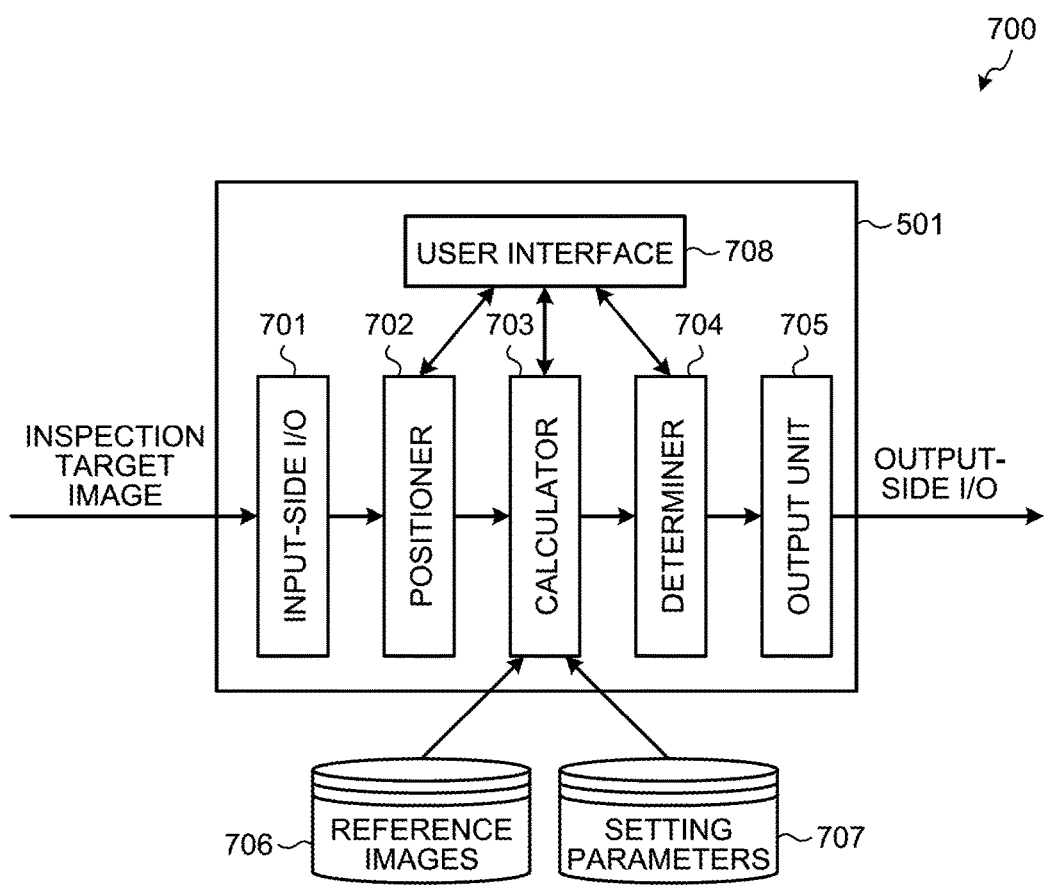
FIG. 7 is a diagram illustrating an implementation form of a software block 700 of the controller 501 according to the present embodiment.

FIG. 7 illustrates an implementation form of a software block 700 of the controller 501 according to the present embodiment. The controller 501 receives an inspection target image from the image capturing device 608 by using an appropriate transfer protocol such as the universal serial bus (USB) or HDMI (registered trademark), or another appropriate transfer protocol such as the Ethernet (registered trademark) in another implementation form. The controller 501 includes an input-side I/O 701, a positioner (pre-processor)702, and a calculator 703, and the input-side I/O 701 corresponds to an input unit in the present embodiment. The input-side I/O 701 can be constructed of components including an appropriate bus interface and a network interface card (NIC). The input-side I/O 701 is enabled to store the received inspection target image in, for example, the image RAM 602, which is an appropriate storage unit.

The positioner 702 enables subsequent processing by positioning, relative to the inspection region 110, a target image acquired by the image capturing device 608 that needs to be inspected next. Additionally, the positioner 702 performs processing of noise-reducing filtering and masking. The positioner 702 may be referred to as a pre-processor. For example, the positioner 702 can perform the positioning by performing processing in which to associate at least one pixel or region in the acquired inspection target image with certain positional coordinates within the inspection region 110.

The calculator 703 provides the function of calculating outliers according to the present embodiment, and corresponding to a unit to calculate color-related feature values and a unit to calculate an outlier in the present embodiment. The calculator 703 may include a plurality of calculators to perform the respective calculations including those described later. To perform the processing, the calculator 703 accesses a storage unit 706 in which reference images have been stored, and a second storage unit 707 in which setting parameters are stored, and then calculates an outlier in comparison with pixels in the reference images by using parameters thus acquired. Examples of each of the setting parameters used in this case include, but are not limited to, a value for specifying the range of surrounding regions, identification values for reference images to be acquired, standard deviations (values of $\sigma$) calculated in advance for the reference images, averages calculated in advance of feature values for the reference images, and a value of std(i, j). These values and parameters are described later in further detail.

The controller 501 further includes a determiner 704 and an output unit 705. The determiner 704 receives an outlier generated by the calculator 703 and determines, by the application of a set threshold, whether an inspection target is nonconforming. In response to the determination, the output unit 705 calculates control information for controlling the conveyance arm 505 and outputs the control information to the output-side I/O 503, thereby enabling control of the conveyance arm 505.

The controller 501 according to the present embodiment further includes a user interface 708. The user interface 708 has the functions of enabling a user to input various settings to the controller 501 and notifying the user of results of the controller 501. Specifically, the user interface 708 can have, for example, the function of enabling a user to define an SOI 113, and the function of enabling a user to define the number of regions to be included in an SOI 113. The user interface 708 further has the function of enabling a user to change and define a range of surrounding regions from which an outlier is to be calculated, the function of enlarging and reducing the size of an inspection image, and the function of having outlier calculation executed based on an inspection image the size of which has been enlarged or reduced. Furthermore, a user is enabled to add a new reference image and replace reference images with others through the user interface 708.

Figure 8:
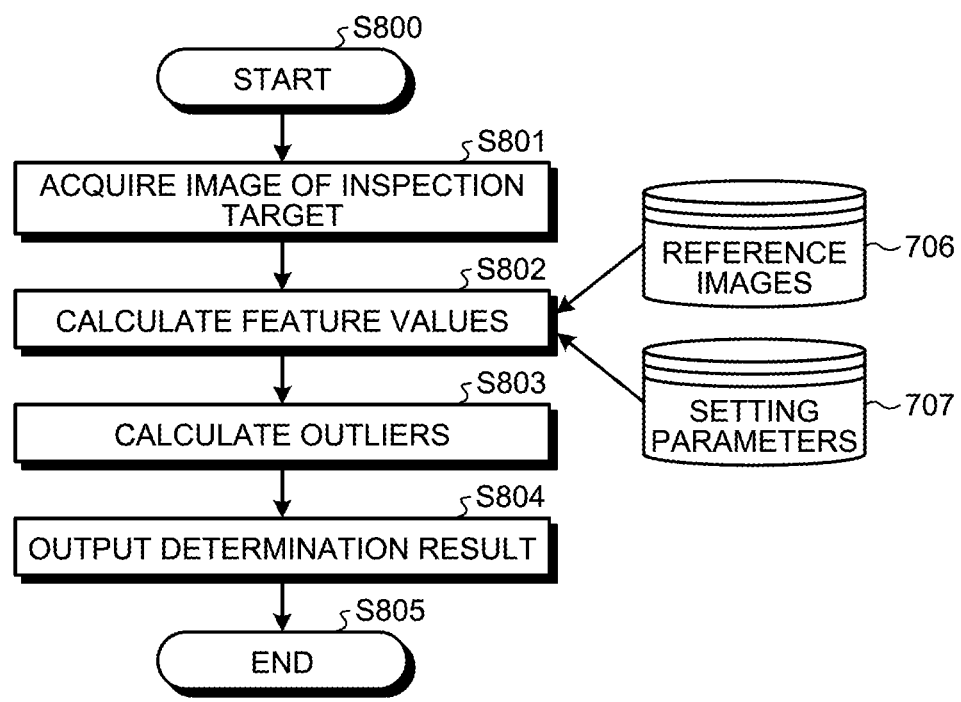
FIG. 8 is a flowchart explaining a processing method according to the present embodiment.

Next, a processing method according to the present embodiment is explained with reference to FIG. 8. The processing starts at Step S800, and an image of an inspection target is acquired at Step S801. The pre-processing is then applied to the inspection region 110 and the inspection target image. For example, positioning of images relative to one another can be included in the pre-processing. This positioning is performed by reading out any appropriate reference image that corresponds to the inspection target from the storage unit 706, and defining this reference image as a template. Note that a user can delete or add a reference image as appropriate when the need arises in the processing.

The positioning is then performed as processing in which: the coincidence between feature values for the target image to be inspected and feature values for the template is determined; regions the feature values of which have the highest coincidence are determined to be the same region; and the regions are then associated with corresponding regions in the inspection region 110. A method for the template matching can be implemented by what is called the Zero-mean Normalized Cross Correlation (ZNCC) method. In addition, the pre-processing can include, in accordance with the purpose, enlarging or reducing the size of an image and controlling the quantity of information to be retained by one pixel or one region.

Subsequently, at Step S802, the calculator 703 defines regions based on pixels, areas, and/or shapes assigned to the inspection region, and calculates feature values for the respective regions. As described above, as long as the feature values can be extracted from an image, the feature values may be any scale values such as luminance values or color values, and there are no limits on what kind the feature values are of and how they are formulated. To provide more specific explanation, luminance values are used as the feature values in the following explanation. However, the present embodiment is not limited to processing that uses luminance values.

At Step S803, the calculator 703 then compares the feature values thus obtained with feature values of each corresponding region and surrounding regions thereof, and calculates an outlier. A method for calculating an outlier is not particularly limited. Using standard scores as in the case of the present embodiment is applicable as the method. Otherwise, using a box-plot chart, a Grubbs test, Mahalanobis' distances, the local outlier factor (LOF). Here, processing for calculating an outlier to be executed by the calculator 703 is explained in detail. In the following explanation, the position of an ROI is denoted as a position (i, j), and the respective surrounding regions that surround the target region are denoted as positions (i±1, j±1). This implementation form corresponds to an implementation form in which the surrounding regions 113b are defined as regions that surround the ROI 113a adjacently thereto. The values of i and j can be any integers selected from positive integers including 0.

First, the calculator 703 reads out a group of reference images (for example, 50 images containing conforming items), calculates averages n(i, j) and standard deviation std(i, j) of luminance values for all of the regions, and stores results of the calculation in an appropriate storage unit. Note that the feature values of each of the reference images have been calculated in advance as described above. In this calculation, depending on the group of reference images, std(i, j) may be extremely close to 0, whereby an overflow exception may occur in calculation. For this reason, in another implementation form, a threshold $std_{13}$ min can be set for std(i, j), and any std(i, j) equal to or less than the threshold can be converted into the value of $std_{13}$ min. A configuration that makes it possible to set $std_{13}$ min from the outside in accordance with the purpose is also applicable.

In the calculation of an outlier, from the luminance value v(i, j) at the pixel position (i, j) of the ROI 113a, residual absolute values are calculated between the pixel position (i, j) corresponding thereto in the group of reference images, and an average m(i, j) of the luminance values of the reference images, which has been calculated with information on the inspection target that is currently subjected to the determination. Calculation of the square of the residual can be included if needed. Note that the reference image is defined as an inspection image that is acquired and registered in advance and that contains an inspection target 111 determined to be a conforming item or as a set of such inspection images. This residual absolute value is then divided by the standard deviation std(i, j) of the ROI 113a in the reference images. The result of the division is quantified as an outlier. Note that this processing is a statistical standardization method and that what is called an outlier is a value corresponding to a standard score of the ROI 113a in the group of reference images.

The same calculating operations are performed by use of all of the averages and the standard deviations of the surrounding regions 113b, that is, at pixel positions (i±1, j±1). In a specific implementation form, the minimum value among the outliers thus calculated are set as the outlier of the ROI 113a. Obviously, in some specific implementation modes, the maximum value among the outliers can be quantified as the outlier of the ROI 113a. The above processing is expressed by Equation (7) below.

$$\text{Outlier}(i, j) = \min\left\{\text{abs}\left(\frac{v(i, j) - m(i+k, j+1)}{std(i+k, j+1)}\right)\right\} \quad (7)$$

This calculation is performed on all of the regions within the inspection image, so that an outlier corresponding to the complete image is quantified. Note that the SOI 113 is set and changed in accordance with user specification using values of (i, j), k, and l. The range of (i, j) corresponding to an image range from which the outlier is calculated is also changed as appropriate in accordance with user specification.

After the outlier is calculated at Step S803, determination processing is performed by the determiner 704. In the present embodiment, the determination processing is performed in the following specific manner. A defection score, which in an indicator for use in determination as to whether an inspection image contains an image of a conforming item, is further calculated by use of the outliers of the respective positions of the regions. This indicator is hereinafter referred to as a defection score in the present disclosure.

In the present embodiment, the standard deviation (hereinafter referred to as σ) of the outliers corresponding to complete images is used as a scale value for indicating how unnoticeable an image singularity is, and a certain threshold is set. For example, on the assumption that an outlier equal to or less than 3σ has a value of 0, such an outlier is cut off and the outliers of the complete images are multiplied by one another. As a result, an image of a conforming item results in a further lower defection score. The defection score thus allows for enhancement of the difference thereof with an image of a nonconforming item. The value σ is a standard deviation obtained on the assumption that the distribution of outliers of the ROIs that have been obtained for a complete image is normally distributed, and differs from std(i, j) described above. Note that the values and the parameters to be used for these calculations can be updated and learned as new values and parameters in accordance with the progress of the processing.

In the above described multiplication processing in a preferred implementation form, for the purpose of accuracy improvement, the multiplication can be performed while any outlier equal to or less than the set threshold, that is, an outlier of an image region the image singularity of which is unnoticeable, is set to 0. The reason for this is that: the outliers found by Equation (7) above have non-zero values because of influence thereon of various noise components even for any outlier obtained from a normal image region applied to the processing; and, if the outliers originally calculated are multiplied by each other, the accumulated noise components cause reduction of the signal/noise ratio (S/N) of the image singularity of a nonconforming item, thereby possibly reducing the detection performance.

The defection score in the present embodiment can be determined by any one of various alternative methods. For example, in an exemplary implementation form, the defection score is defined as a value obtained by multiplying the above described outliers by one another, as given by Equation (8) below.

$$\text{Defection score} = \sum_{I} \text{Outlier}(i, j) \quad (8)$$

The defection score in the present embodiment can be obtained by still other methods. Implementation forms for calculating the defection score by these other methods are described next. The defection score can be determined alternatively as the maximum value among outliers by use of Equation (9).

$$\text{Defection score} = \max\{\text{Outlier}\} \quad (9)$$

In still another implementation form, processing is performed as illustrated in (a) in FIG. 9 to find the area of regions in each of which at least one outlier is contained, and the defection score can be then determined as the number of pixels contained in this area by use of Equation (10) below.

$$\text{Defection score} = \sum_{I} P(i, j) \quad (10)$$

$$P(i, j) = \begin{cases} 1: \text{Outlier}(i, j) > \text{threshold} \\ 0: \text{Outlier}(i, j) \leq \text{threshold} \end{cases}$$

In still another implementation form, an area to be defined as the defection score can be determined by use of coordinates of a circumscribed rectangle by Equation (11) as illustrated in (b) in FIG. 9, and the number of pixels contained in this area can be used as the defection score. In Equation (11) below, k denotes a pixel identification value for a region, in the image, an outlier in the region of which is equal to or more than a certain value.

$$\text{Defection score} = \sum_{K} S_k \quad (11)$$

$$S_k = (x\max_k - x\min_k) * (y\max_k - y\min_k)$$

Note that a value to be set as the threshold can be set based on, for example, the shape of a target and positioning accuracy in accordance with the purpose. Furthermore, for example, having a location dense with high outliers can be determined as a singular state.

At Step S804, a determination as to whether the inspection target is nonconforming is made by use of the above-described defection score obtained from the outliers, and the result of the determination is output, so that moves of the conveyance arm 505 are controlled. The processing is then ended at Step S805.

Figure 10:
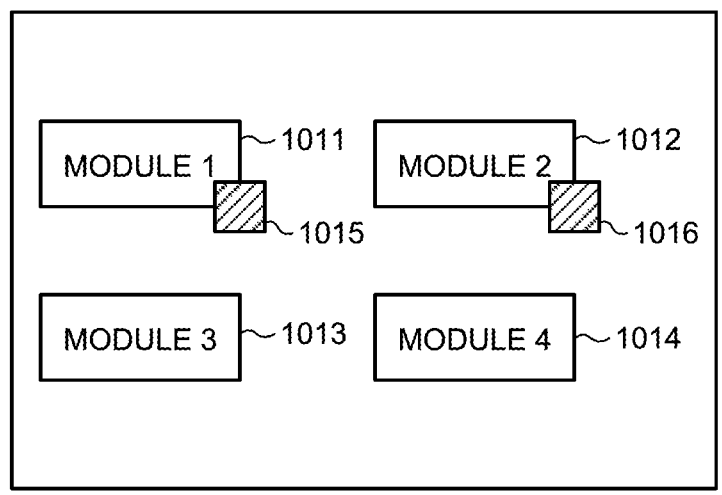
FIG. 10 is a diagram illustrating another implementation form according to the present embodiment.

The above described implementation forms have been described as those configured to calculate values such as the defection score using the neighborhood of a target pixel. Alternatively, in another exemplary implementation form, when there are a plurality of identical modules 1011 and 1012 within the inspection image as illustrated in FIG. 10, the controller 501 is enabled to calculate the defection score of the module 1012 with reference to an ROI 1016 in the defection score of the module 1011 because a user is enabled to set an inspection region. This implementation form enables calculation of an outlier without reading out the group of reference images each time the calculation is performed, thus allowing for economical use of a memory and reduction in time for downloading reference data.

The controller 501 is further enabled to, when the inspection image contains a region desired to be excluded from inspection (such as a region that has a manufacturer's serial number printed, a region to which attachment of dust or taint means nothing, or a region corresponding to a robot arm holding a part under inspection), employ what is called mask processing in which a user excludes the region. Furthermore, the controller 501 may control the quantity of information retained by one pixel or one region by enabling a user to enlarge or reduce the size of an image and enlarging or reducing the size of the image in the pre-processing.

The reason for this is that reduction in calculation cost can be achieved by decreasing the size of reference regions. Thus, the resolution of an image can be reduced to the extent not causing an accuracy problem. For this purpose, the quantity of information retained by one pixel or one region can be increased, which consequently makes it possible to reduce the calculation cost and speed up inspection.

In addition, when the resolution of an image having a small singular region is reduced, the singular region becomes smaller, and determination accuracy is possibly reduced. Therefore, in another exemplary implementation form, the controller 501 is configured to prohibit reduction of a specified region in response to user specification, and this configuration can be expected to enable the control to speed up the determination and keep the determination accuracy from reducing. To take inspection of electronic substrates as an example, the calculation cost can be reduced by performing outlier calculation without reducing the resolutions of regions each dense with minute components, with the resolutions of the other regions reduced.

In still another exemplary implementation form, the controller 501 may be configured to enable a user to update reference images by adding a reference image or replacing any one of the reference images with another reference image. The reason for this is that reference images are considered to be subject to, for example, influence from production lots they are from, variations in data due to age deterioration of lighting, and changes in definition of normality and abnormality due to modifications to a product model. When reference images are thus affected, parameters then cannot be expected to bring sufficient accuracy to inspection. In such a case, parameters are updated by addition of a reference image and changes of reference images, so that determination as desired by the user using the update parameters is enabled.

Figure 11:
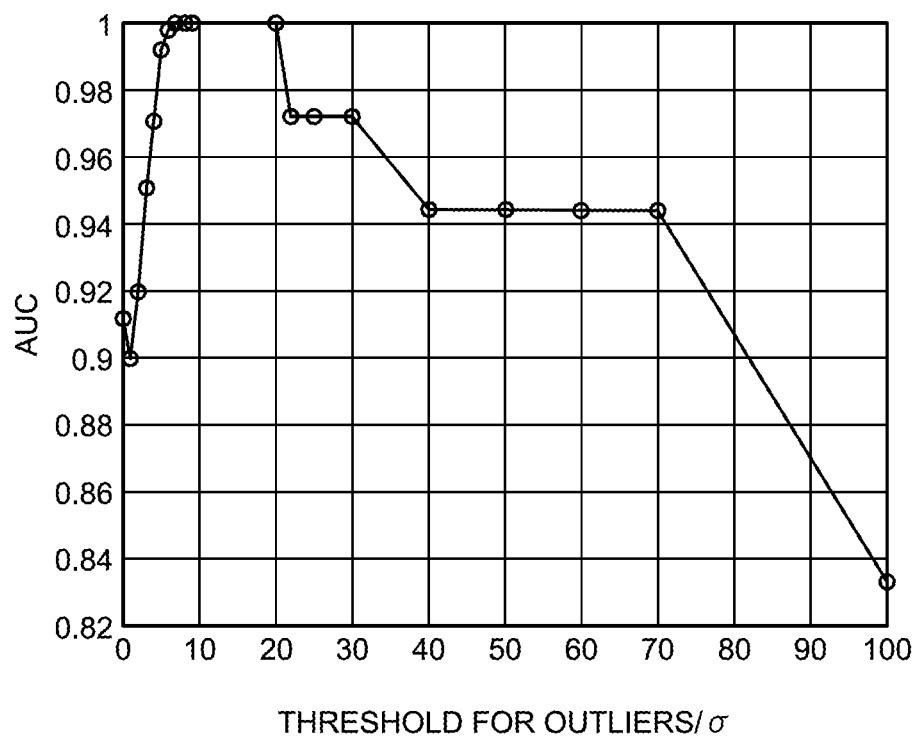
FIG. 11 is a graph plotting an area under curve (AUC) for thresholds to be set for outliers.

FIG. 11 is a graph plotting an area under curve (AUC) for thresholds to be set for outliers. Here, the AUC is an indicator value that gives a scale value for inspection accuracy, giving 1 unless a determination has been made erroneously. The graph shows that the AUC is substantially linearly improved as the threshold is increased from $0\sigma$ to a value close to $5\sigma$. In contrast, the thresholds in the range of $6\sigma$ to $7\sigma$ reach saturation in terms of the effect of improving the AUC. This is because, as a result of setting outliers equal to or less than the threshold to $0\sigma$, the defection score is calculated with small outliers at normal pixels ignored and the AUC is not affected when the defection store is not extremely large.

Figure 12:
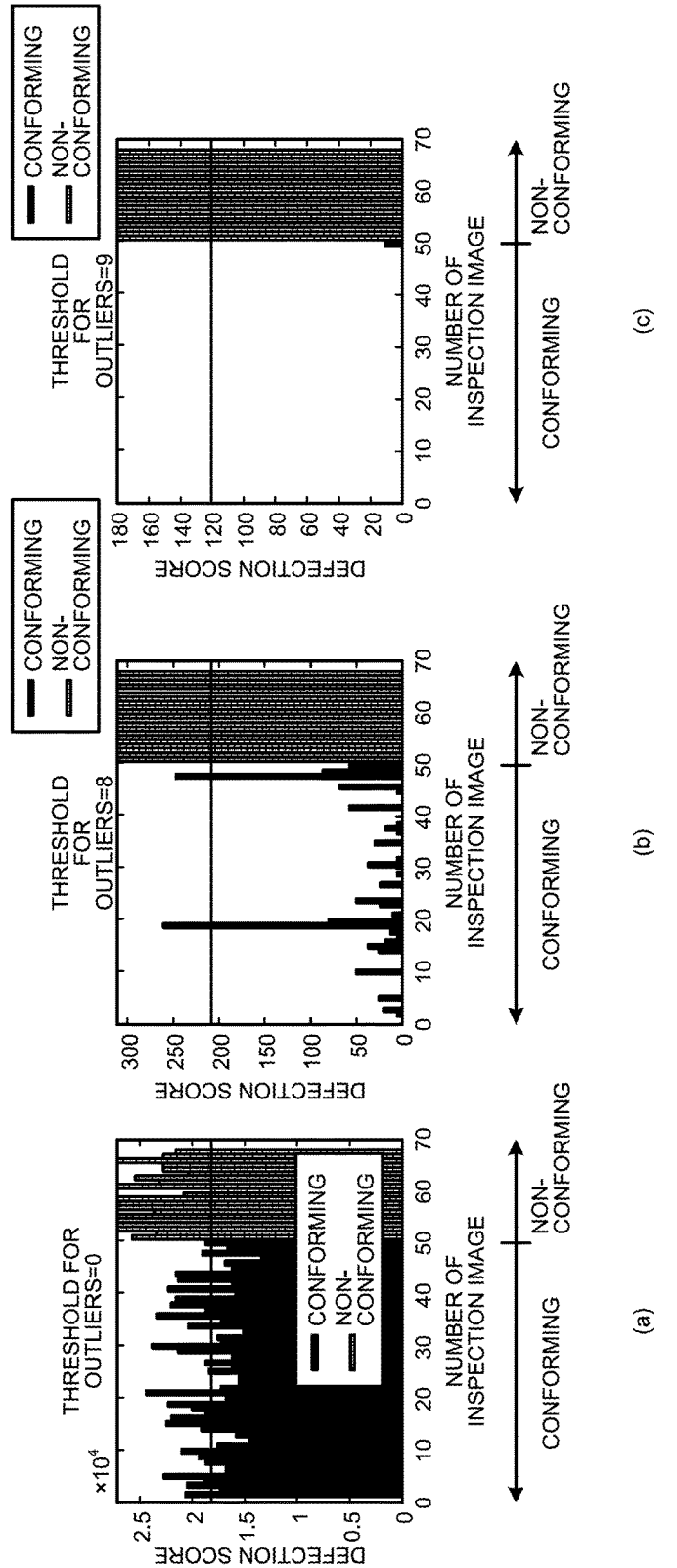
FIG. 12 is a diagram illustrating experimental examples in which defection scores obtained in image evaluations conducted on actual inspection targets are associated with conforming items and nonconforming items among the inspection targets.

FIG. 12 illustrates experimental examples in which defection scores obtained in image evaluations conducted on actual inspection targets are associated with conforming items and nonconforming items among the inspection targets. In FIG. 12, (a), (b), and (c) are results of examples in which the thresholds for outliers were set to $0\sigma$, $6\sigma$, and $9\sigma$, respectively, and in each of which the defection scores of about 70 inspection images were evaluated. As illustrated in FIG. 12, when the threshold applied to outliers was set to $0\sigma$, the differences in defection scores between conforming item samples and nonconforming item samples cannot be considered conspicuous because of noise accumulation.

Regarding the experimental example in which the threshold was set to $6\sigma$, however, it can be confirmed that the defection scores of the conforming item samples were free of influence from noise accumulation and conspicuously decreased. Furthermore, when the threshold was set to $9\sigma$, the defection scores of almost all of the conforming item samples were 0, which indicates that the differences thereof with the nonconforming items were more clearly recognized.

Figure 13:
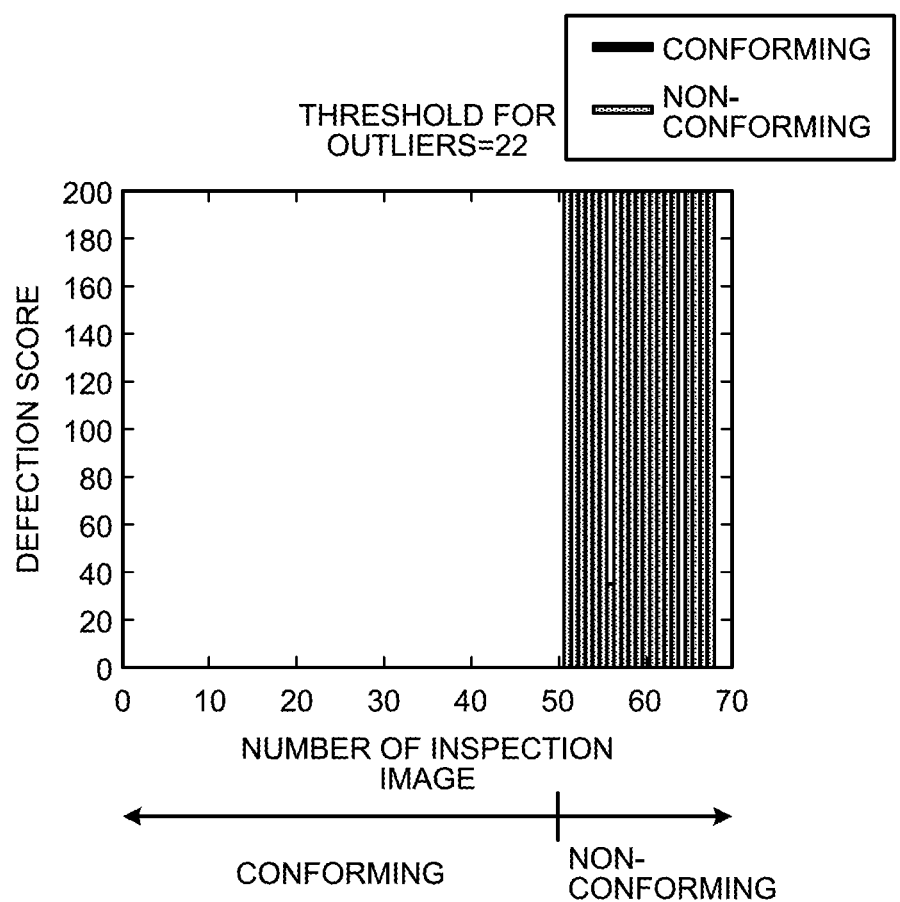
FIG. 13 is a diagram illustrating defection scores in an experimental example using the same method as illustrated in FIG. 8 with the threshold set to 22σ.

FIG. 13 illustrates defection scores in an experimental example using the same method as illustrated in FIG. 12 with the threshold set to 226. FIG. 13 indicates the same improvement as FIG. 12 such that the defection scores of the conforming item samples reached to 0. However, the defection scores of some of the nonconforming item samples were also valued at 0. This is possibly because the defection scores of some nonconforming item samples that have relatively low singularity decreased as a result of using the high threshold.

The inspection system according to the present embodiment is configured on the premise that conforming items and nonconforming items are selected based on determinations made by the controller 501, and it is therefore preferable that the possibility of falsely recognizing a nonconforming item as a conforming item be eliminated. From this viewpoint, it is preferable that the threshold to be applied to outliers be set to a value between $5\sigma$ and $20\sigma$, based on the result in FIG. 11.

Figure 14:
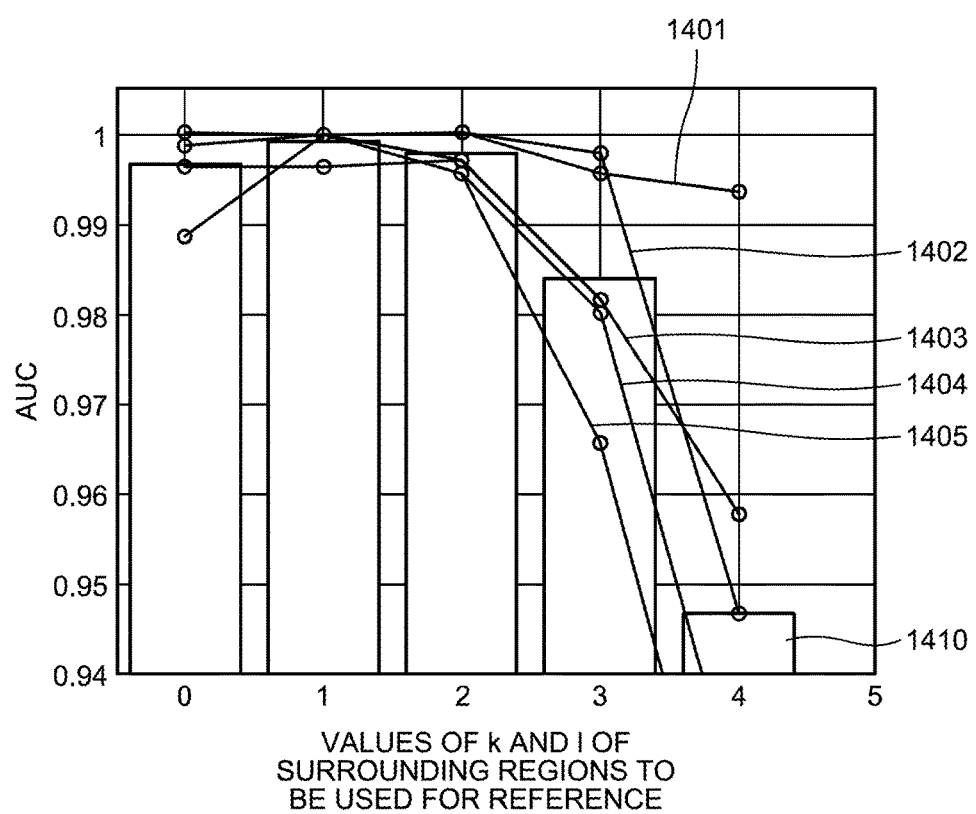
FIG. 14 is a diagram illustrating changes in recognition performances (AUCs) depending on the size of surrounding regions (the number of neighbors) used for reference.

FIG. 14 illustrates changes in recognition performances (AUCs) depending on the size (the number of neighbors) of surrounding regions used for reference. Results illustrated for FIG. 14 are those obtained with each ROI set to one pixel. The results for different five samples 1401, 1402, 1403, 1404, and 1005 are represented as line graphs and the averages thereof are represented as a bar graph 1410.

"The number of neighbors=0" means a case in which no surrounding region was used for reference. In the case of "the number of neighbors=1", it is indicated that the nearest neighboring pixels of a target pixel illustrated in FIG. 1 were used for reference. In the case of "the number of neighbors=1" in which the nearest neighboring pixels were used for reference, the average (in the blue bar graph) of the AUCs that indicate recognition performances is higher than in the case in which no surrounding region was used for reference. In the case of "the number of neighbors=2", the average of the AUCs is higher than in the case in which no region was used for reference.

However, the AUCs were found lower in the case of "the number of neighbors=3" than in the case of "the number of neighbors=2". This is possibly partly because, with an increased number of regions used for reference, the probability of statistically containing therein a location that gives a value close to those considered as nonconforming increases, resulting in decrease of the sensitivity to nonconforming items. The AUCs were found further lower in the case of "the number of neighbors=4".

On a sample-to-sample basis, the AUCs of some samples, the samples 1401 and 1403, were 1 (their highest performances) at the number of neighbors=0. The AUCs of those samples did not decrease and were maintained at high values at "the number of neighbors=1" and at "the number of neighbors=2". Therefore, it is preferable that the number of neighbors to be used for reference in the present embodiment be set to 1 or 2.

As described above, the present invention makes it possible to provide an information processing device, an information processing method, a computer program, and an inspection system that enable efficient detection of singularity within an image regardless of where an inspection target is positioned, what shape it has, and where abnormalities are distributed.

The present invention makes it possible to provide an information processing device, an information processing method, a computer program, and an inspection system that enable efficient detection of an abnormality within an image.

The above-described embodiments are illustrative and do not limit the present invention. Thus, numerous additional modifications and variations are possible in light of the above teachings. For example, at least one element of different illustrative and exemplary embodiments herein may be combined with each other or substituted for each other within the scope of this disclosure and appended claims. Further, features of components of the embodiments, such as the number, the position, and the shape are not limited the embodiments and thus may be preferably set. It is therefore to be understood that within the scope of the appended claims, the disclosure of the present invention may be practiced otherwise than as specifically described herein.

The method steps, processes, or operations described herein are not to be construed as necessarily requiring their performance in the particular order discussed or illustrated, unless specifically identified as an order of performance or clearly identified through the context. It is also to be understood that additional or alternative steps may be employed.

Further, any of the above-described apparatus, devices or units can be implemented as a hardware apparatus, such as a special-purpose circuit or device, or as a hardware/software combination, such as a processor executing a software program.

Further, as described above, any one of the above-described and other methods of the present invention may be embodied in the form of a computer program stored in any kind of storage medium. Examples of storage mediums include, but are not limited to, flexible disk, hard disk, optical discs, magneto-optical discs, magnetic tapes, non-volatile memory, semiconductor memory, read-only-memory (ROM), etc.

Alternatively, any one of the above-described and other methods of the present invention may be implemented by an application specific integrated circuit (ASIC), a digital signal processor (DSP) or a field programmable gate array (FPGA), prepared by interconnecting an appropriate network of conventional component circuits or by a combination thereof with one or more conventional general purpose microprocessors or signal processors programmed accordingly.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA) and conventional circuit components arranged to perform the recited functions.

What is claimed is:

1. An information processing device for inspecting a target image that contains an image of an inspection target, the information processing device comprising:
   circuitry including at least a processor and a memory, the circuitry configured to:
   perform pre-processing for comparing the target image with a reference image or a plurality of reference images;
   define, in the target image, a region of interest (ROI) and surrounding regions that are adjacent to the ROI, and calculate a feature value of the ROI;
   calculate an outlier from comparison with feature values of images corresponding to the ROI and the surrounding regions in the reference images, the outlier numerically indicating singularity of an image at the ROI;
   provide, based on the outlier, an indicator to be used for the inspection; and
   determine defections in the inspection target from the target image by using the indicator.

2. The information processing device according to claim 1, wherein the circuitry is further configured to:
   reduce noise components included in the outlier when the outlier is obtained, and
   generate the indicator by using the outlier from which the noise components have been cut out.

3. The information processing device according to claim 1, wherein the feature value is a value generated by use of a luminance value, a color value, edge information, spatial frequency information, texture information, or a neural network.

4. The information processing device according to claim 1, wherein the circuitry is further configured to quantify the singularity of the image in a form of a standard score with respect to corresponding regions in the reference images.

5. The information processing device according to claim 1, wherein the circuitry is further configured to enable change of a size of the surrounding regions.

6. The information processing device according to claim 1, wherein the circuitry is further configured to enlarge or reduce the entire target image or a part of the target image in size.

7. The information processing device according to claim 1, wherein the circuitry is further configured to calculate the outlier by using the target image that has been enlarged or reduced in size.

8. The information processing device according to claim 1, wherein the circuitry is further configured to:
   add the reference image,
   enable a threshold for the outlier to be externally set,
   update parameters for use in calculating the outlier while including the added reference image in the calculation, and
   calculate the outlier with the updated parameters after the updating.

9. A method performed in an information processing device to quantify a target image that contains an image of an inspection target, the method comprising:
   performing pre-processing for comparing the target image with a reference image or a plurality of reference images;
   defining, in the target image, a region of interest (ROI) and surrounding regions that are adjacent to the ROI to calculate a feature value of the ROI;
   calculating an outlier from comparison with feature values of images corresponding to the ROI and the surrounding regions in the reference images, the outlier numerically indicating singularity of an image at the ROI;
   providing, based on the outlier, an indicator to be used for the inspection; and
   determining defections in the inspection target from the target image by using the indicator.

10. The method according to claim 9, further comprising:
    reducing noise components included in the outlier when the outlier is obtained; and
    generating the indicator by using the outlier from which the noise components have been cut out.

11. The method according to claim 9, wherein the feature value is a value generated by use of a luminance value, a color value, edge information, spatial frequency information, texture information, or a neural network.

12. The method according to claim 9, further comprising quantifying the singularity of the image in a form of a standard score with respect to corresponding regions in the reference images.

13. A non-transitory computer-readable recording medium with an executable program stored thereon, wherein the program instructs a computer to perform the method according to claim 9.

14. An inspection system for inspecting an inspection target, the inspection system comprising:
    circuitry including at least a processor and a memory, the circuitry configured to:
    acquire a target image that contains an image of the inspection target;
    perform pre-processing for comparing the target image with a reference image or a plurality of reference images;
    define, in the target image, a region of interest (ROI) and surrounding regions that are adjacent to the ROI, and calculate a feature value of the ROI;
    calculate an outlier from comparison with feature values of images, in the reference images, that correspond to the ROI and the surrounding regions, the outlier numerically indicating singularity of an image at the ROI;
provide, based on the outlier, an indicator to be used for the inspection; and
reduce noise components included in the outlier when the outlier is obtained, wherein
the circuitry provides the indicator by using the outlier from which the noise components have been cut out, and determines defection in the inspection target from the target image by using the indicator.

* * * * *